United States Patent [19]
Ouchi

[11] Patent Number: 5,987,494
[45] Date of Patent: Nov. 16, 1999

[54] MULTI-FUNCTION PARALLEL PROCESSING ELECTRONIC DEVICE

[75] Inventor: Tetsuya Ouchi, Tajimi, Japan

[73] Assignee: Brother Kogyo Kabushiki Kaisha, Nagoya, Japan

[21] Appl. No.: 08/923,124

[22] Filed: Sep. 4, 1997

[30] Foreign Application Priority Data

Sep. 5, 1996 [JP] Japan ................................. 8-257712

[51] Int. Cl.⁶ .............................. G06F 9/00; G06F 13/14
[52] U.S. Cl. ......................... 709/107; 709/103; 710/224; 712/228; 345/334
[58] Field of Search ............................. 395/800.42, 677, 395/670, 673; 345/113, 114, 507, 508, 334, 345; 712/32, 42, 288; 710/7, 20, 45, 244; 709/4, 5, 8, 9, 1, 100, 103, 104, 107, 108

[56] References Cited

U.S. PATENT DOCUMENTS

| | | | |
|---|---|---|---|
| 4,652,020 | 3/1987 | Cheselka et al. | 345/344 |
| 4,658,351 | 4/1987 | Teng | 709/4 |
| 4,713,656 | 12/1987 | Clliff et al. | 345/146 |

*Primary Examiner*—John A. Follansbee
*Attorney, Agent, or Firm*—Oliff & Berridge, PLC

[57] ABSTRACT

A multi-function concurrent processing device that is capable of performing a plurality of functions by using time sharing methods to concurrently process at least two control programs. The multi-function concurrent processing device includes a computer having a ROM storing a plurality of control programs corresponding to a plurality of functions; a display unit having a display commonly used for the plurality of functions; and a plurality of display data buffers provided in a one-to-one correspondence with the plurality of control programs stored in the ROM, each of the plurality of display data buffers exclusively storing display data for displaying, on the display, display information generated in association with execution of a corresponding one of the plurality of control programs stored in the ROM.

8 Claims, 3 Drawing Sheets

MULTI-FUNCTION PARALLEL PROCESSING ELECTRONIC DEVICE

BACKGROUND OF THE INVENTION

1. Field of the Invention

The present invention relates to a multi-function concurrent processing device capable of concurrently processing a plurality of control programs using time sharing methods.

2. Description of the Related Art

Recently, many electronic devices, such as information processing devices, include an internal computer of some sort. In order to more rapidly process a plurality of functions, such as a computation process function or a process function for inputting and outputting information, one such electronic device uses a type of multi-function concurrent processing called multi-processing to concurrently process the plurality of functions. The electronic device includes a plurality of central processing units connected in series. In order to perform the plurality of functions, an operation system with a concurrent process management system uses the CPUs to separately execute a plurality of control programs that correspond to the plurality of functions.

The electronic device that utilizes multi-function concurrent processing includes a display, such as a liquid crystal display (LCD) or a cathode ray tube display (CRT display). A variety of messages relating to errors and changes in condition of the electronic device are generated in association with execution of the variety of control programs. Each message is displayed at a predetermined region of the display allotted for display of that message. The user can grasp and gain an understanding of the present execution condition of the plurality of functions by viewing the corresponding messages displayed on the display.

It should be noted that other electronic devices use time sharing methods to more rapidly process a plurality of functions. During time sharing processes, a single processing unit executes a plurality of control programs one after the other in a predetermined order each time a short predetermined processing time elapses.

SUMMARY OF THE INVENTION

However, multi-processing requires a plurality of central processing units to concurrently process the plurality of functions. Also, the control device must be provided with a large control board. As a result, the electronic device is costly to produce.

Because only a single central processing unit is required when using time sharing methods, it is conceivable to reduce the costs of display data management by using time sharing methods and further by storing all display data in a common single display data buffer. However, if only a single display data buffer is provided, the display data generated in association with execution of the plurality of control programs during time sharing processes will be stored in the same display data buffer. Because the display data will be updated each time a different control program is executed, each time the short predetermined processing time set for time sharing elapses, display data associated with one control program will be written over by display data associated with a subsequent control program. As a result, display data can not be maintained in the display data buffer unless only a single control program is being executed.

It is an objective of the present invention to overcome the above-described problems and to provide a multi-function concurrent processing electronic device capable of, when using time sharing methods to concurrently process a plurality of control programs corresponding to a plurality of functions, simply and accurately performing display information management by managing display data separately for each control program.

In order to achieve these objectives, a multi-function concurrent processing device according to the present invention is capable of performing a plurality of functions by using time sharing methods to concurrently process at least two control programs. Moreover, the multi-function concurrent processing device includes: a computer having a ROM storing a plurality of control programs corresponding to a plurality of functions; a display unit having a display commonly used for the plurality of functions; and a plurality of display data buffers provided in a one-to-one correspondence with the plurality of control programs stored in the ROM, each of the plurality of display data buffers exclusively storing display data for displaying, on the display, display information generated in association with execution of a corresponding one of the plurality of control programs stored in the ROM.

With this configuration, a plurality of functions are performed by concurrently processing at least two, or as many as needed, of the plurality of control programs stored in the ROM using time sharing processes. The display data for displaying, on the display, display information generated in association with execution of the control programs is stored separately in corresponding display data buffers provided exclusively for corresponding ones of the control programs. Therefore, display data relevant to each control program can be reliably stored until the corresponding control program is completed. As a result, management of display information for one control program can be reliably and simply performed without adversely affecting display data for other control programs.

According to another aspect of the present invention, the plurality of display buffers are provided in a RAM of the computer. With this configuration, there is no need for additional memory for the buffers so that the resultant multi-function concurrent processing electronic device can be produced more inexpensively and in a compact shape.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
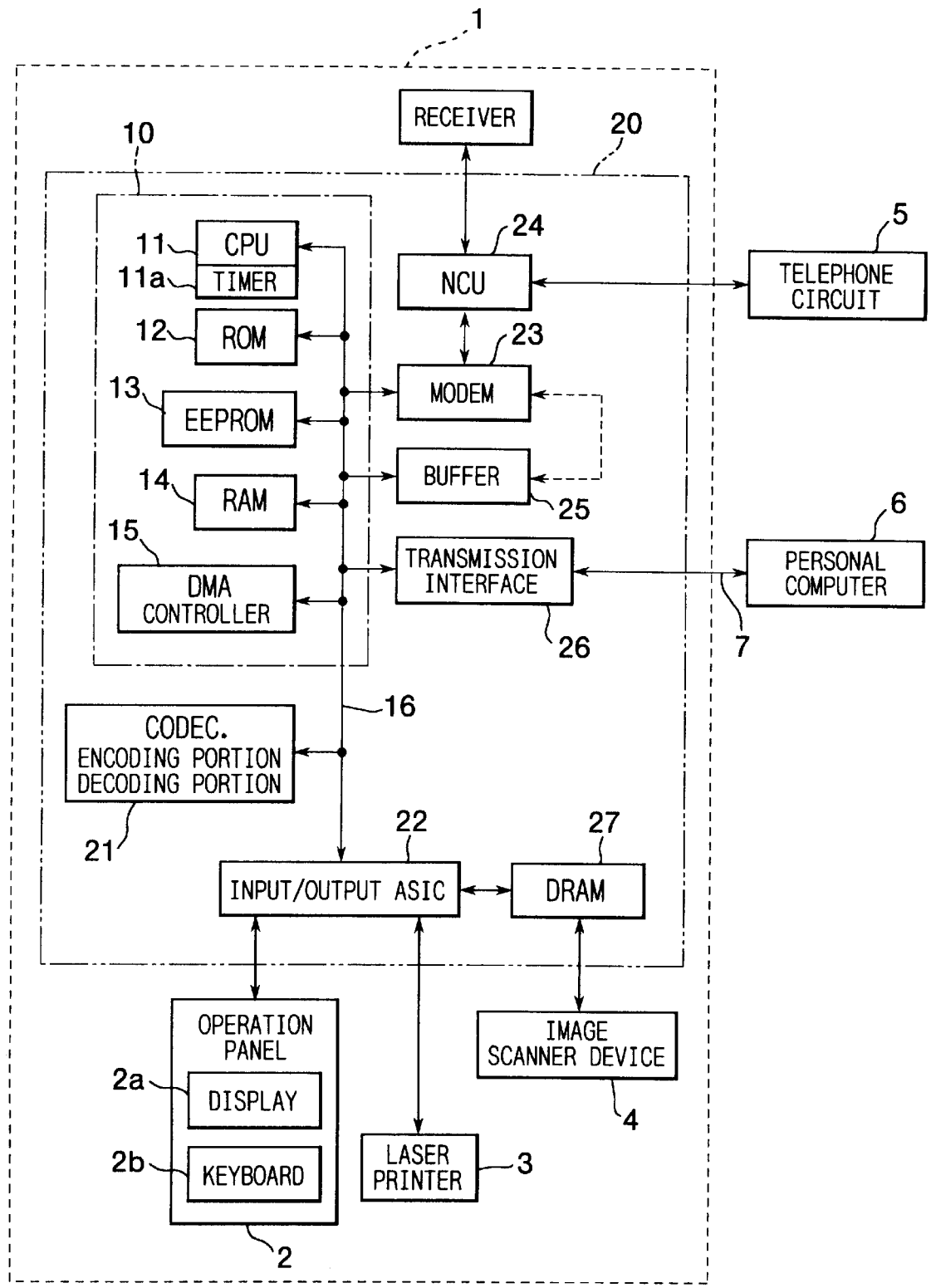
FIG. 1 is a block diagram showing electrical configuration of a multi-function peripheral device according to an embodiment of the present invention.

A multi-function concurrent processing electronic device according to a preferred embodiment of the present invention will be described while referring to the accompanying drawings wherein like parts and components are designated by the same reference numerals to avoid duplicating description.

The present embodiment describes the present invention applied to a multi-function information processing device 1. As shown in FIG. 1, the multi-function information processing device 1 includes: a control unit 20 having a single computer 10, an operation panel 2, a laser printer 3, and an image scanner 4. The operation panel 2, the laser printer 3, and the image scanner 4 are connected to the control unit 20.

The computer 10 includes: a CPU 11, a ROM 12, an EEPROM 13, a RAM 14, and a direct memory access (DMA) controller 15. The EEPROM 13, the RAM 14 and the DMA controller 15 are connected to the CPU 11 by a common bus 16, including a data bus and the like. A timer 11a is provided internally to the CPU 11. The common bus 16 is connected to a variety of components, including: a coder-decoder (CODEC) 21 having an encoder portion for encoding image data to be transmitted and a decoder portion for decoding received data; an input/output application specific integrated circuit (ASIC) 22 for inputting and outputting data and made from a hard logic circuit; a modem 23 for performing facsimile transmission; a buffer 25; and a transmission interface 26 connected to an external personal computer 6 via a connection cable 7. A network controller unit (NCU) 24 is connected to the modem 23. A telephone circuit 5 and a receiver 8 are connected to the NCU 24. Further, the operation panel 2 and the laser printer 3 are connected to the input/output ASIC 22. The operation panel 2 has a display 2a and a keyboard 2b. A dynamic RAM (DRAM) 27 is connected to the input/output ASIC 22. The DRAM 27 is for temporarily storing two to three lines' worth of dot data retrieved by the image scanner 4. The image scanner 4 is connected to the input/output ASIC 22 via the DRAM 27.

The multi-function information processing device 1 is provided with a facsimile function including: a normal facsimile function, wherein facsimile data received by the modem 23 can be printed using the laser printer 3 and wherein image data retrieved from an original document using the image scanner 4 can be transmitted over the telephone circuit 5; and also a data transmission function, by which data received by the modem 23 can be transmitted to the personal computer 6 over the connection cable 7 or data from the computer 6 can be transmitted over the telephone circuit 5.

The ROM 12 stores a variety of control programs, such as: a control program for executing the facsimile function, for example, for controlling transmission and reception of facsimile data between the multi-function information processing device 1 and a remote facsimile device (not shown in the drawings) via the telephone circuit 5; a control program for executing a copy function for recording images retrieved from a document by the image scanner 4; a control program for executing a print data recording function for using the laser printer 3 to record print data received from the external personal computer 6; a control program for executing an image transmission function for transmitting, to the external personal computer 6, image data retrieved from the document by the image scanner 4; and a display information management control program to be described later.

The control program for executing the facsimile function includes a variety of subroutines, such as: an idling routine for constantly detecting changes in the condition of the multi-function information processing device 1; a reception control routine for receiving facsimile data over the telephone circuit 5; a recording routine for recording the received facsimile data using the laser printer 3; an image retrieval routine for retrieving image data from a document using the image scanner 4; and a transmission control routine for transmitting the retrieved image data as facsimile data over the telephone circuit 5.

The CPU 11 of the multi-function information processing device 1 uses time sharing methods and so is able to receive a timer interrupt at a predetermined timing determined by the internal timer 11a. As a result, the CPU 11 is able to consecutively switch, at the predetermined timing, between execution of the different control programs, which correspond to the plurality of functions. For example, when the idling routine is concurrently processed with the control program for executing the print data recording function or when the recording routine is concurrently processed with the control program for executing the image transmission function, then each time the CPU 11 receives a timer interrupt signal from the timer 11a at a timing of, for example, each 1/60 of a second, then the CPU 11 switches execution, in the former case, from executing the idling routine to executing the control program for executing the print data recording function or vice versa or, in the later case, from executing the recording routine to executing the control program for executing the image transmission function or vice versa. In this way, the plurality of functions can be executed.

Figure 2:
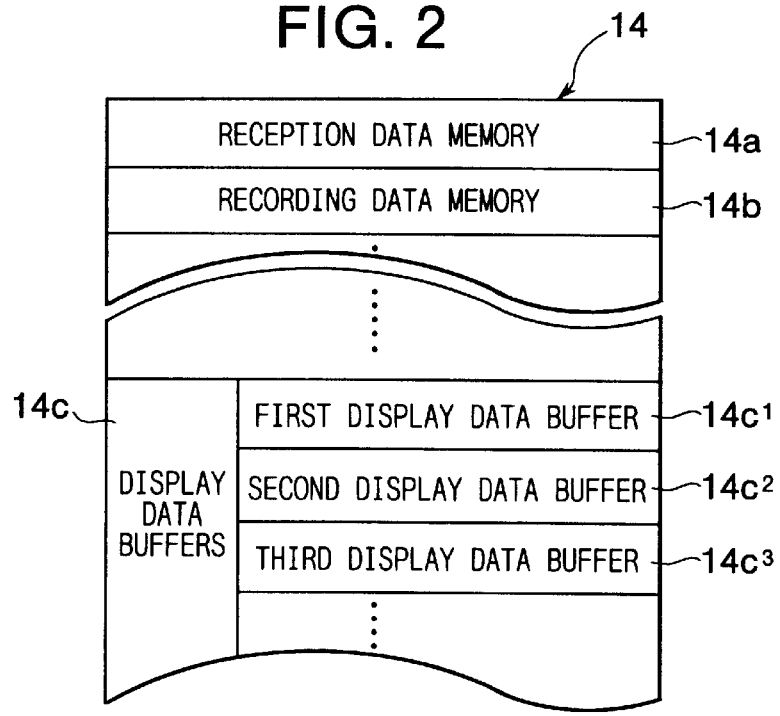
FIG. 2 is a schematic view showing a RAM of the multi-function peripheral device including display data buffers.

The EEPROM 13 stores, in a changeable manner, a variety of setting modes used during the facsimile function and also stores telephone numbers and the like of a plurality of remote facsimile devices. As shown in FIG. 2, the RAM 14 includes: a reception data memory 14a for storing data received from an incoming facsimile message; a recording data memory 14b for storing dot image data produced by developing the received data into a form recordable using the laser printer 3; and a variety of memories and buffers required to execute control programs for performing a plurality of functions, such as the facsimile function and the copy function.

The RAM 14 is also provided with a display data buffer 14c formed from a plurality of display data buffers: such as a first display data buffer $14c^1$, a second display data buffer $14c^2$, and a third display data buffer $14c^3$. Each of the display data buffers corresponds to one of the plurality of control programs and is used exclusively for storing display data for displaying, on the display 2a, display information generated in association with the corresponding control program. In the present embodiment, the first display data buffer $14c^1$ is used exclusively for storing display data for displaying display information generated in association with the control program for the facsimile function and the second display data buffer $14c^2$ is used exclusively for storing display data for displaying display information generated in association with the control program for the print data recording function.

Next, an explanation will be provided for routine switching processes according to the present invention. The routine switching processes are performed in the same manner as in subroutine calling performed during conventional interrupt processes. At a time sharing switching timing determined by the internal timer 11a, a variety of data for indicating the location of the next instruction to be interpreted for a routine presently being performed is stored in a predetermined stack memory of the RAM 14. Examples of such data includes program counter (PC) data and status register (SR) data relating to process control of the CPU 11. Also at the time sharing switching timing, the routine execution is switched to perform another routine and PC data and SR data relating to the other routine is retrieved from the corresponding exclusive stack memory of the RAM 14. In this way, routine switching processes are performed by switching storage of PC data and SR data relating to operations of the CPU 11.

Figure 3:
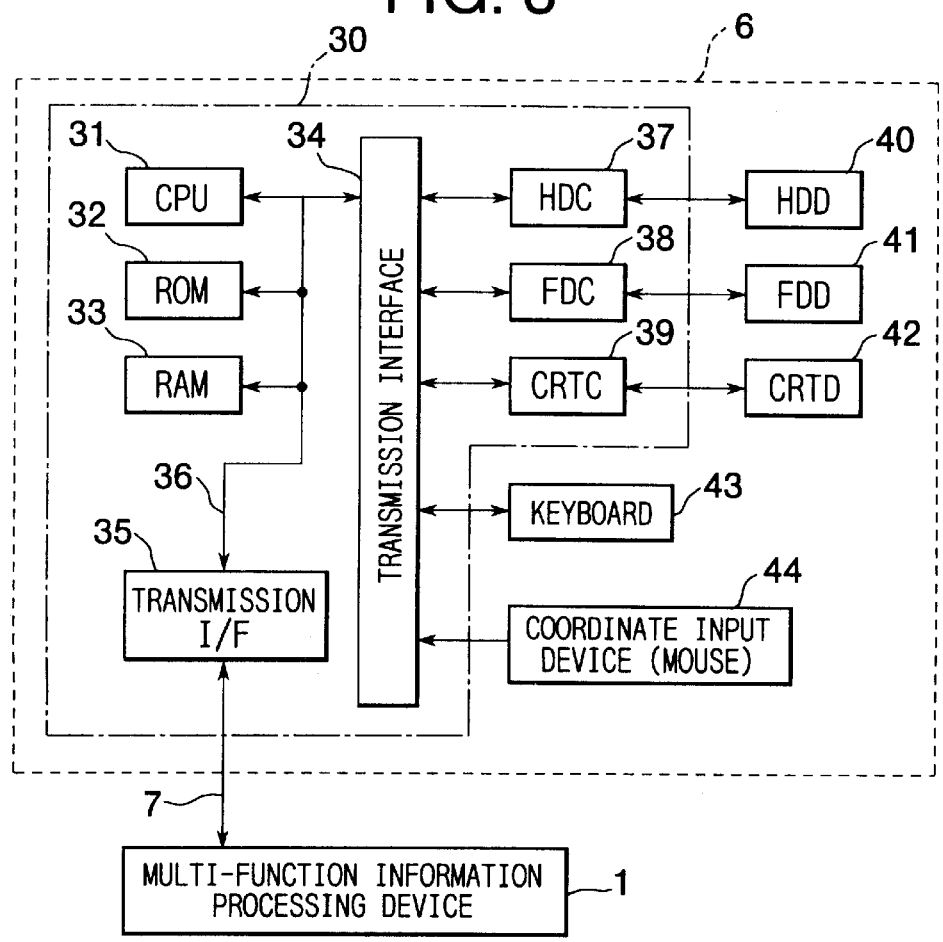
FIG. 3 is a block diagram showing electrical configuration of a personal computer while the personal computer is connected to the multi-function peripheral device.

Next, an explanation will be provided for the external personal computer 6 while referring to FIG. 3. The external personal computer 6 includes a control device 30, which is connected to a variety of components, such as: a hard disk drive device (HDD) 40, a floppy disk drive device (FDD) 41, a CRT display (CRTD) 42, a keyboard 43, and a coordinate input device (mouse) 44. The control device 30 includes a CPU 31, a ROM 32, a RAM 33, an input/output interface 34, and a transmission interface 35, all connected by a common bus 36 including a data bus.

The input/output interface 34 is connected to a variety of components, such as: a hard disk drive controller (HDC) 37 for controlling drive of the hard disk drive device 40; a floppy disk drive controller (FDC) 38 for controlling drive of the floppy disk drive device 41; and a CRT controller (CRTC) 39 for controlling the drive of the CRT display 42. The multi-function information processing device 1 is connected to the transmission interface 35 via the connection cable 7.

With this configuration, a variety of processes can be performed. For example, print data prepared in the external personal computer 6 can be transmitted to the multi-function information processing device 1 and recorded on the laser printer 3. Also, image data retrieved by the image scanner 4 can be inputted to the external personal computer 6.

Figure 4:
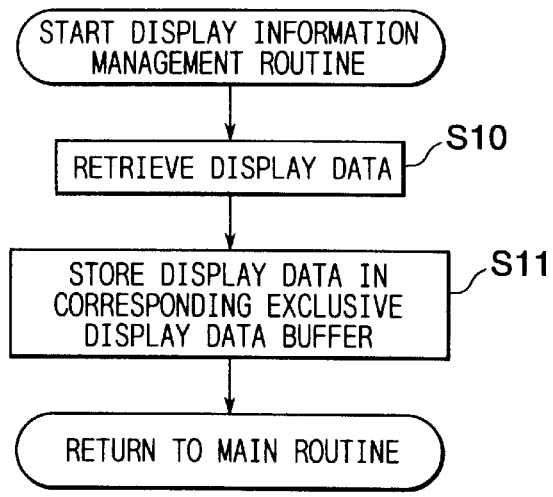
FIG. 4 is a flowchart representing a display information management routine performed by the multi-function peripheral device of FIG. 1.

Next, while referring to the flowchart shown in FIG. 4, an explanation will be provided for a display information management routine of the display information management control program. When a plurality of the control programs, which correspond to the plurality of functions, are concurrently processed using time sharing methods, sometimes new display information is generated when execution is switched from one control program to another. The display information management routine is executed in a subroutine started up each time display information is changed in this way. In the flowchart, Si (i=10 and 11) indicates individual steps.

When this routine is started, then in S10, display data for displaying display information generated by the presently executed control program is retrieved from the ROM 12. Then in S11, the display data is stored in the corresponding display data buffer of the display data buffers 14c exclusively for the control program. Then, this routine ends and the program returns to the main routine.

Figure 5:
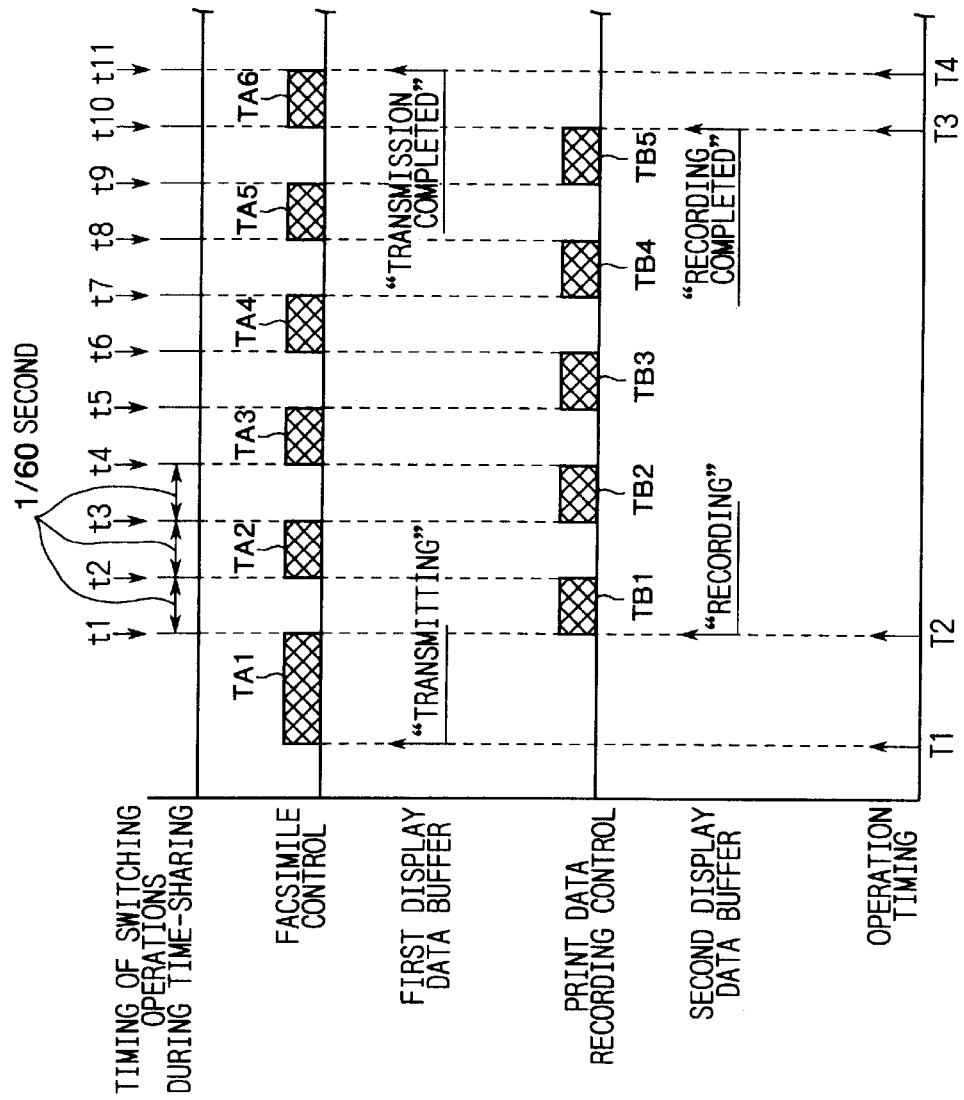
FIG. 5 is a timing chart showing timing of processes performed for a facsimile control and a print data recording control.

Next, while referring to the timing chart shown in FIG. 5, an example will be provided for performing a plurality of functions of the multi-function information processing device 1. In this example, image data transmission processes and print data recording processes are concurrently processed using time sharing methods. Of the difference facsimile processes performed by the multi-function information processing device 1, the image data transmission processes include an image retrieval process for using the image scanner device 4 to retrieve an image from an original document and a transmission control process for facsimile transmitting the retrieved image data using the modem 23. The print data recording routine is for using the laser printer 3 to record print data inputted from the external personal computer 6.

At timing T1, data transmission control is started by executing control programs for image retrieval processes. transmission control processes and the like. Image data transmission processes TA1 are executed starting from the timing T1. Also, at timing T1, display data for displaying a message "TRANSMITTING" is stored in the exclusive first display data buffer $14c^1$ when image data transmission starts.

Next, at a timing T2, image data is received from the external personal computer 6 before the image data transmission processes TA1 are completed. As a result, from timing T2, image data transmission processes TA and print data recording processes TB are concurrently processed by time sharing methods. At timing T2, display data for displaying a message "RECORDING" is stored in the exclusive second display data buffer $14c^2$ when recording of print data starts.

From timing T2 and on, at time sharing switching timings t1 to t10 which occur every 1/60 of a second, print data recording processes TB1, TB2, TB3 . . . and image data transmission processes TA2, TA3, TA4 are executed in alternation to perform processes concurrently using time sharing. Recording of print data is completed at timing T3. Therefore, at timing T3 the last print data recording process TB5 is completed and the content of the exclusive second display data buffer $14c^2$ is rewritten to store display data for displaying message "RECORDING COMPLETED". As a result, the message "RECORDING" will be displayed on the display 2a from timing T2 until timing T3, whereupon the message "RECORDING COMPLETED" will be displayed. It should be noted that when an error message is generated during execution of any of the print data recording process TB1 to TB5, that is, at any time between timing T2 and T3, then display data for displaying a message "ERROR" is stored in the second display data buffer $14c^2$ and the message "ERROR" will be displayed on the display 2a instead of the messages "RECORDING" and "RECORDING COMPLETED."

On the other hand, transmission of image data is completed at timing T4. Therefore, at timing T4 the last image data transmission process TA6 is completed and the content of the exclusive first display data buffer $14c^1$ is rewritten to store display data for displaying a message "TRANSMISSION COMPLETED". As a result, the message "TRANSMITTING" will be displayed on the display 2a from timing T1 until timing T4, whereupon the message "TRANSMISSION COMPLETED" will be displayed. It should be noted that if an error is generated during execution of any of the image data transmission processes TA1 to TA6, then, display data for displaying message "ERROR" is stored in the first display data buffer $14c^1$ and the message "ERROR" will be displayed on the display 2a instead of the messages "TRANSMITTING" and "TRANSMISSION COMPLETED."

In the present embodiment, all of the functions are set with a priority level for determining which display data is to be displayed when more than one control program are concurrently processed. In the example shown in FIG. 5, wherein time sharing methods are used to process the image data transmission processes TA concurrently with the print data recording processes TB, then, display data relating to the control program set with a higher priority is retrieved from the display data buffer corresponding to that control program and displayed with priority on the display 2a. For example, when image data transmission processes are set with a higher priority than the print data recording processes, then the message "TRANSMITTING" will be displayed on the display 2a even when display data for displaying "RECORDING" is stored in the second display data buffer $14c^2$ while display data for displaying "TRANSMITTING" is stored in the first display data buffer $14c^1$.

In summary, the multi-function information processing device 1 is provided with a single computer 10, which includes the CPU 11 and the operation panel 2, which is used in common for a plurality of functions. A plurality of control programs corresponding to the plurality of functions, such as a facsimile function and a print data recording function, are stored in the ROM 12 of the computer 10. The multi-function information processing device 1 is capable of performing the plurality of functions by concurrently processing more than two of the control programs using time sharing methods. The display data buffer memory 14c is provided in the RAM 14. The display data buffer 14c is divided into exclusive display data buffers $14c^1$ and on, which have a one-to-one correspondence with the plurality of control programs. The exclusive display data buffers $14c^1$ and on are for storing display data for displaying, on the display 2a, display information generated in association with execution of corresponding control programs.

With this configuration, display data for displaying, on the display 2a, display information generated in association with execution of control programs is stored in corresponding ones of the exclusive display data buffers of the display data buffer 14c. Therefore, display data relating to each control program can be maintained reliably in the memory until the corresponding control program is completed without adversely affecting display data of other control programs. As a result, display information management can be reliably and simply performed.

While the invention has been described in detail with reference to specific embodiments thereof, it would be apparent to those skilled in the art that various changes and modifications may be made therein without departing from the spirit of the invention, the scope of which is defined by the attached claims.

For example, although at least one data buffer for storing display data must be provided to the RAM 14, the number of the display data buffers can be increased in accordance with the number of control program processes performed using time sharing processes. Further, the present invention can be applied to a variety of electrical devices that use multi-function concurrent processes for concurrently processing a plurality of functions, such as computation processes and processes for inputting and outputting information.

What is claimed is:

1. A multi-function concurrent processing device capable of performing a plurality of functions by using time sharing methods to concurrently process at least two control programs, the multi-function concurrent processing device comprising:

a computer having a ROM storing a plurality of control programs corresponding to a plurality of functions;

a display unit having a display commonly used for the plurality of functions; and a plurality of display data buffers provided in a one-to-one correspondence with the plurality of control programs stored in the ROM, each of the plurality of display data buffers exclusively storing display data for displaying, on the display, display information generated in association with execution of a corresponding one of the plurality of control programs stored in the ROM;

wherein: the functions are set with different priority levels for determining which display data is to be displayed based on importance of the display data and independent of a user selection; and when control programs are being concurrently processed, the computer displays, on the display, display data corresponding to a highest priority control program of the control programs being concurrently processed, the highest priority control program corresponding to a function set with a highest priority level of all functions corresponding to the control programs being concurrently processed.

2. A multi-function concurrent processing device as claimed in claim 1, wherein the computer further has a RAM, the plurality of display data buffers being provided in the RAM.

3. A multi-function concurrent processing device as claimed in claim 1, wherein display data stored in each of the plurality of display data buffers is displayed on the display while its corresponding control program is being executed.

4. A multi-function concurrent processing device as claimed in claim 3, wherein display data stored in each of the plurality of display data buffers is displayed on the display while its corresponding control program is being executed unless an error is generated in the corresponding control program, whereupon display data for indicating an error is stored in corresponding display buffer and displayed on the display.

5. A facsimile machine capable of performing a plurality of functions by using time sharing methods to concurrently process at least two control programs, the facsimile machine comprising:

a computer having a ROM storing a plurality of control programs corresponding to a plurality of functions;

a display unit having a display commonly used for the plurality of functions; and a plurality of display data buffers provided in a one-to-one correspondence with the plurality of control programs stored in the ROM, each of the plurality of display data buffers exclusively storing display data for displaying, on the display, display information generated in association with execution of a corresponding one of the plurality of control programs stored in the ROM;

wherein: the functions are set with different priority levels for determining which display data is to be displayed based on importance of the display data and independent of a user selection; and when control programs are being concurrently processed, the computer displays, on the display, display data corresponding to a highest priority control program of the control programs being concurrently processed, the highest priority control program corresponding to a function set with a highest priority level of all functions corresponding to the control programs being concurrently processed.

6. A facsimile machine as claimed in claim 5, wherein the computer further has a RAM, the plurality of display data buffers being provided in the RAM.

7. A facsimile machine as claimed in claim 5, wherein display data stored in each of the plurality of display data buffers is displayed on the display while its corresponding control program is being executed.

8. A facsimile machine as claimed in claim 7, wherein display data stored in each of the plurality of display data buffers is displayed on the display while its corresponding control program is being executed unless an error is generated in the corresponding control program, whereupon display data for indicating an error is stored in corresponding display buffer and displayed on the display.

* * * * *